UNITED STATES PATENT OFFICE.

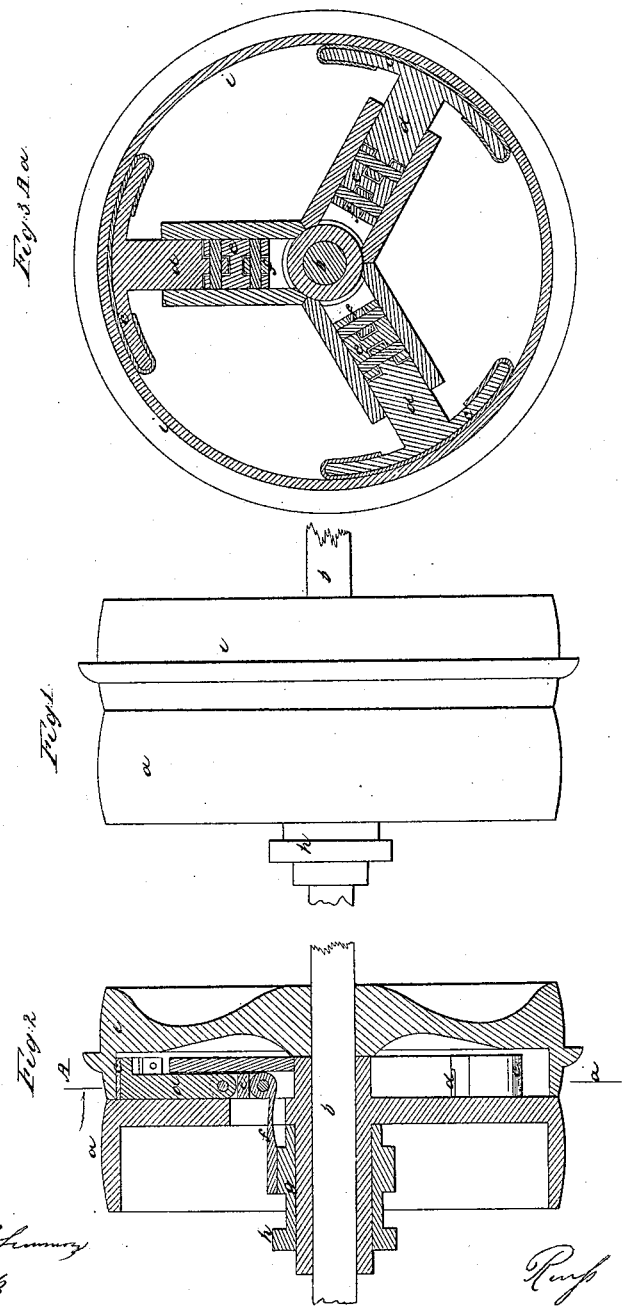

RENSSELAER REYNOLDS, OF STOCKPORT, NEW YORK.

CENTRIFUGAL FRICTION-CLUTCH.

Specification of Letters Patent No. 16,748, dated March 3, 1857.

*To all whom it may concern:*

Be it known that I, RENSSELAER REYNOLDS, of Stockport, Columbia county, and State of New York, have invented a new and useful Improvement in Self-Adjusting Centrifugal Friction-Clutches for Power-Looms and other Machinery, of which the following is a full, clear, and exact description, reference being had to the accompanying drawings, making part of this specification, in which—

Figure 1, is an elevation of a shaft with a clutch pulley; Fig. 2, a longitudinal section; and Fig. 3, a cross section taken at the line A, $a$ of Fig. 2, and looking in the direction of the arrow.

The same letters indicate like parts in all the figures.

The object of my invention is to make a clutch for connecting and disconnecting machinery which shall hold and connect by friction alone and act to form the friction connection by centrifugal force alone. And to this end the nature of my invention consists in the employment of sector friction brakes which make friction against the inner periphery of a wheel attached to, and turning with the shaft, the said sector friction brakes being connected with another wheel turning freely on the said shaft and being combined with a thimble which slides on the said shaft by means of jointed links and springs. By means of this arrangement and combination when the thimble is liberated the centrifugal action due to the rotation will force the sector brakes against the inner periphery of the fast wheel and increase the friction in the ratio of the increased velocity of the rotation. It is only necessary to liberate the thimble effect the clutching, while in all other friction clutches, heretofore made, the clutch can only make friction by the direct application of power. And by the connection of the sector brakes with the thimble, by means of interposed springs, the sectors are rendered self adapting to the periphery of the wheel on which they make friction.

In the accompanying drawings $a$ represents a pulley, or other wheel which receives motion from the motor, and which is mounted to turn freely on the shaft $b$ and therefore technically termed the loose pulley or wheel. On the inner face of this wheel are mounted three (more or less) sector friction brakes $c$, $c$, $c$, on the outer end of radial arms $d$ which are adapted to slide radially in suitable ways on the face of the wheel. The inner ends of the arms are connected by joint links $e$, $e$, $e$, with the ends of springs $f$, $f$, $f$, attached to, and projecting from, the inner end of a thimble $g$ which slides and turns freely on the hub of the loose pulley, the said thimble having the usual collar $h$ to receive the fork of a shipper lever of the usual kind. By the side of the loose pulley or wheel $a$ there is another wheel $i$ secured on, and turning with the shaft, and technically termed a fast wheel. The inner periphery of the rim of this fast wheel is cylindrical and extends over the sector friction brakes. The joint or hinged links $e$, $e$, $e$, may be of such length if desired as to be slightly inclined to the face of the wheel when the friction brakes are in contact with the inner periphery of the fast wheel or pulley that after the friction surfaces of the brakes have worn away they may not be required to overcome the tension of the springs in making friction on the inner periphery of the fast wheel as they are forced outward by the centrifugal action due to the rotation.

When the loose wheel is in motion the moment the thimble is liberated, by letting go the usual shipper lever, the centrifugal action of the sector brakes forces them outward until their outer surfaces bear against the inner periphery of the fast wheel and make friction thereon, thereby clutching it so that motion is imparted thereby to the fast wheel and shaft to impart the required motion to the machinery connected either with the fast wheel or the shaft. And by drawing out the thimble by the shipper lever, the sectors are drawn in and liberate the fast wheel so that it can be readily stopped. As the arms of the sectors are connected with the thimble by joint links with interposed springs the sectors will adjust themselves to the inner periphery of the fast wheel notwithstanding the surfaces may wear unequally.

I am aware that friction clutches have been made with sector friction brakes sliding radially to make friction against the inner periphery of a wheel or pulley, but when so made they have been connected with springs the tension of which forces them inward and away from the inner periphery of the wheel or pulley on which they are required to make friction, and when required to clutch by friction the said sectors are required to be forced outward by the sliding of a thimble which acts on the said friction brakes by brace rods interposed. It being necessary to overcome the tension of the said springs by force applied to the thimble before the brakes can make friction on the wheel to be clutched. And besides, such friction brakes have been attached to the shaft or wheel required to be set in motion by the clutching, so that the friction brakes could not be forced outward by centrifugal force to effect the clutching. I do not wish to be understood as limiting my claim of invention to the special construction specified as the same mode of operation may be obtained by the substitution of equivalents. Nor do I wish to be understood as making claim to the use of radially sliding friction brakes for the purpose of clutching as these have been used for that purpose but under a different arrangement resulting in a mode of operation essentially different from that which constitutes my said invention.

What I claim as my invention and desire to secure by Letters Patent is—

The employment in the combination substantially as herein specified of the sector friction brakes sliding radially in the wheel or pulley which rotates before the clutching takes place and usually termed the loose pulley that the other wheel or fast pulley may be clutched by the friction of the brakes due to the centrifugal force generated by the rotation and by which they are forced outward against the inner periphery of the wheel to be clutched, as described, thereby clutching the parts by a force no greater than that due to the friction produced by the centrifugal force under the determined proportions, weight and rotative velocity of the friction brakes.

RENSS. REYNOLDS.

Witnesses:
   CHARLES W. SIMONS,
   JAMES COOK.